(12) United States Patent
Zhao et al.

(10) Patent No.: US 12,488,004 B2
(45) Date of Patent: Dec. 2, 2025

(54) QUESTION ANSWERING RETRIEVAL VIA SPARSE TRANSFORMER MATCHING

(71) Applicant: SOCO, Inc., Pittsburgh, PA (US)

(72) Inventors: Tiancheng Zhao, Pittsburgh, PA (US); Kyusong Lee, Pittsburgh, PA (US)

(73) Assignee: SOCO, Inc., Pittsburgh, PA (US)

( * ) Notice: Subject to any disclaimer, the term of this patent is extended or adjusted under 35 U.S.C. 154(b) by 358 days.

(21) Appl. No.: 17/073,630

(22) Filed: Oct. 19, 2020

(65) Prior Publication Data

US 2021/0374141 A1 Dec. 2, 2021

Related U.S. Application Data

(60) Provisional application No. 63/032,474, filed on May 29, 2020.

(51) Int. Cl.
*G06F 16/2455* (2019.01)
*G06F 16/2457* (2019.01)
*G06N 20/00* (2019.01)

(52) U.S. Cl.
CPC .. *G06F 16/24558* (2019.01); *G06F 16/24578* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,664,713 B1* | 2/2010 | Haffner | ............... | G06N 20/10 706/12 |
| 8,521,662 B2* | 8/2013 | Chen | ............... | G06N 20/00 706/12 |
| 9,009,148 B2* | 4/2015 | Gao | ............... | G06F 16/9535 707/780 |
| 10,706,450 B1* | 7/2020 | Tavernier | ............ | G06F 16/9535 |
| 2011/0225108 A1* | 9/2011 | Hawkins | ............ | G06N 3/08 706/12 |
| 2011/0282704 A1* | 11/2011 | Graeber | ............ | G06Q 10/063 705/7.11 |
| 2012/0230592 A1* | 9/2012 | Iwamura | ............ | G06F 16/5838 382/201 |
| 2018/0137854 A1* | 5/2018 | Perez | ............ | G06F 40/35 |
| 2018/0174037 A1* | 6/2018 | Henry | ............ | G06F 16/338 |
| 2019/0392082 A1* | 12/2019 | Bell | ............ | G06N 3/08 |
| 2020/0341115 A1* | 10/2020 | Katabi | ............ | G01S 13/583 |
| 2021/0021621 A1* | 1/2021 | Janakiraman | ......... | H04L 41/142 |
| 2021/0056150 A1* | 2/2021 | Karandish | ............ | G06F 16/3329 |
| 2021/0326751 A1* | 10/2021 | Liu | ............ | G06N 3/084 |

OTHER PUBLICATIONS

Bayardo et al., Scaling Up All Pairs Similarity Search, 2007 (Year: 2007).*
Arora et al., Contextual Embeddings: When Are They Worth It?, May 18, 2020 (Year: 2020).*

(Continued)

*Primary Examiner* — Yu Zhao
(74) *Attorney, Agent, or Firm* — FINNEGAN, HENDERSON, FARABOW, GARRETT & DUNNER LLP

(57) ABSTRACT

Systems and methods involving SPARTA (Sparse Transformer Matching) are disclosed. Embodiments may relate to scalable and transferable retrieval methods for question answering.

20 Claims, 3 Drawing Sheets

(56) References Cited

OTHER PUBLICATIONS

Heinzerling, Sequence Tagging with Contextual and Non-Contextual Subword Representations: A Multilingual Evaluation, 2019 (Year: 2019).*

Horev, Bert Explained: State of the art language model for NLP, Nov. 10, 2018, (Year: 2018).*

Ahmad, Amin, et al., "ReQA: An Evaluation for End-to-End Answer Retrieval Models", Google Research, Mountain View, USA, Oct. 4, 2019 (10 pages).

Chen, Danqi, "Reading Wikipedia to Answer Open-Domain Questions", Apr. 28, 2017 (10 pages).

Seo, Minjoon, et al., "Bi-Directional Attention Flow For Machine Comprehension", University of Washington, Allen Institute for Artificial Intelligence, 2017 (13 pages).

* cited by examiner

QUESTION ANSWERING RETRIEVAL VIA SPARSE TRANSFORMER MATCHING

CROSS-REFERENCE TO RELATED APPLICATIONS

This application claims the benefit of priority to U.S. Provisional Application No. 63/032,474 filed on May 29, 2020, the contents of which is herein incorporated by reference in its entirety.

BACKGROUND

Technical Field

Embodiments discussed herein generally relate to question answering (QA), which may be a computer science discipline concerning the fields of information retrieval (IR) and natural language processing (NLP), and in particular to open-domain QA which may be concerned with building systems and methods to automatically answer questions posed by humans in natural language using a pool of free-text documents.

Description of Related Art

Machine reading comprehension (MRC) is a natural language understanding task that aims to extract a span-level answer from a document given input questions. Recent MRC models fine-tuned from large-scale contextualized language representations, e.g. BERT, have surpassed human performance on a number of benchmarks, including SQuAD (Software Quality Across Different Regions). Despite the success of MRC to document-level QA, current methods fail to scale to open-domain QA. For example, BERT-based MRC models can only process a few thousand words per second on a modern GPU.

Open Domain Question-answering may involve machine reading at scale (MRS). Typical approaches may use a search engine to filter down to a few relevant documents and then apply MRC readers to extract answers in order to maintain reasonable response speed. The first stage retriever may be improved by indexing at the paragraph level rather than document level. Yet, the performance of such approaches may be bounded by the IR-based retriever. The retriever may not be trainable and may not be optimized for question answering.

Meanwhile, learning to rank (L2R) is a well-studied topic in the information retrieval community. Recent work has successfully adapted BERT and may achieve a baseline level of performance. However, further improvements in performance are desired.

SUMMARY

Embodiments of the present disclosure may include technological improvements as solutions to one or more technical problems in conventional systems discussed herein as recognized by the inventors. In view of the foregoing, some embodiments discussed herein may provide systems and methods for efficient and generalized question answering retrieval using sparse transformer matching.

There may be provided a computer-implemented method including: determining an index using a machine learning model trained on datasets; and determining a score between first data and second data from the index using a sparse vector representation.

It is to be understood that both the foregoing general description and the following detailed description are exemplary and explanatory only and are not restrictive of the subject matter that may be claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
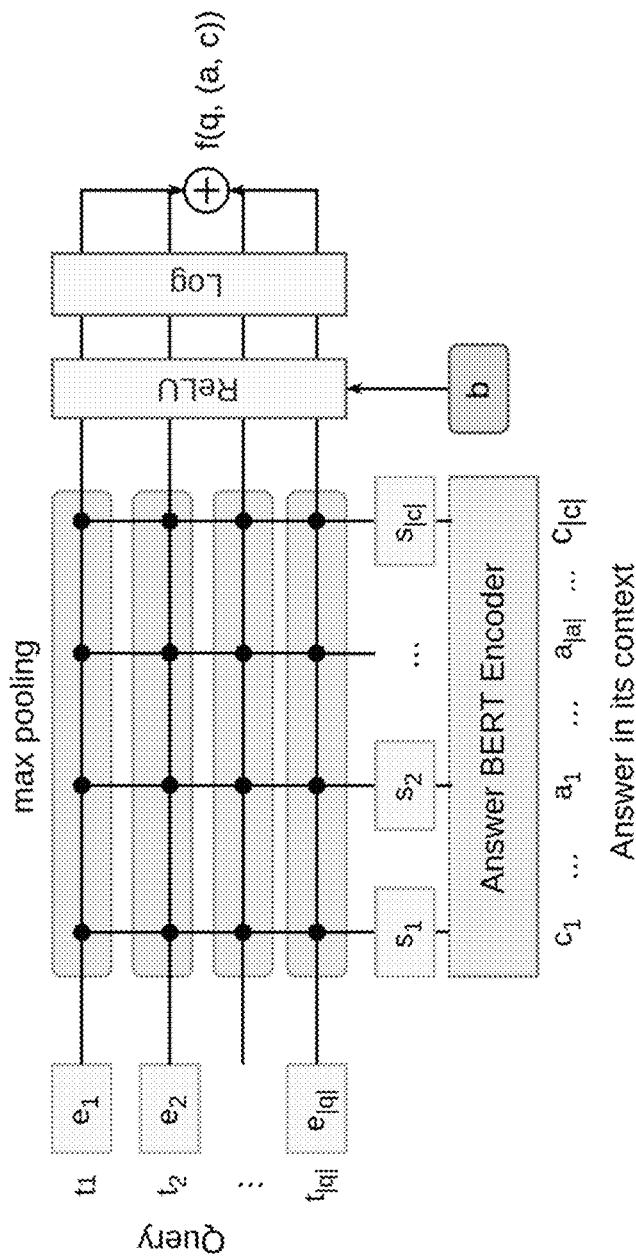
FIG. 1(a) is a diagrammatic representation of rank scoring between an answer and query via SPARTA, consistent with embodiments of the disclosure.

Reference will now be made in detail to exemplary embodiments, examples of which are illustrated in the accompanying drawings. Wherever convenient, the same reference numbers are used throughout the drawings to refer to the same or like parts. The implementations set forth in the following description of exemplary embodiments do not represent all implementations consistent with the present disclosure. While some examples and features of disclosed principles are described herein, modifications, adaptations, and other implementations are possible without departing from the spirit and scope of the disclosed embodiments. It is intended that the following detailed description be considered as merely examples of systems, apparatuses, and methods consistent with aspects related to the invention as may be recited in the appended claims.

Some embodiments may provide a technical advantage of improved performance, faster processing, and more accurate results. For example, some embodiments may achieve performance gain compared to conventional two-tower methods, as well as BM25 in both in-domain test sets and out-of-domain test sets. Moreover, some embodiments may be compatible with Inverted Index (e.g., inverted index data structure), enabling use with modern search engines, e.g., Lucene. Some embodiment may be configured to achieve real-time response without the need for ANN infrastructure. Some embodiments may achieve less than 200 ms delay when searching from 10 million records, an 8,000× increase in speed compared to MRC models, or 200× increase in speed compared to ANN. Furthermore, some embodiments may include an explainable system and may provide human-readable representation that is easy to debug.

Open-domain question answering (QA) concerns the problem of finding answers from a large pool of free-text documents given natural language questions. One powerful and popular approach is machine reading at scale (MRS), which may combine a traditional information retrieval (IR) system with a machine reading comprehension (MRC) model. The IR system is used to filter down to a few relevant documents based on term frequency-inverse document frequency (TF-IDF) or BM25, and then an MRC model is used to extract the final answers. However, this approach is bounded by its pipeline nature and the fact that the first stage search step is not trainable and may return no relevant documents. For example, although there may be documents that are potentially relevant to a query, if those documents do not contain the particular terms extracted from the query, then term-frequency-based methods may not identify the documents as relevant.

To address this, some techniques may attempt to replace the first stage IR engine with a trainable system. Existing approaches may depend on the two-tower approach, where two separate "towers" (e.g., encoders, classifiers, models, etc.) are trained to transform the question and answer to fixed-size vectors, and then their relevance score is computed via dot product or cosine distance. To scale up to millions of answer candidates, approximate nearest neighbor algorithms, e.g., FASIS, may be deployed to achieve real-time response. But this approach also suffers from several limitations, such as (1) inflexibility of artificial neural network (ANN) algorithms that may not be exact and cannot be used with other structured filters; and (2) the system may not be explainable. Moreover, the two-tower approach's performance degrades significantly when testing in domains that are different from the training data, whereas classic IR methods, e.g., BM25, have significantly more robust performance in various domains without any training.

Embodiments discussed herein may involve SPARTA (Sparse Transformer Matching), an indexing method that combines the strength of classic IR with transformer-based representation learning. SPARTA may achieve performance gain compared to two-tower methods, as well as BM25 in both in-domain test sets and out-of-domain test sets. Moreover, SPARTA is compatible with Inverted Index (e.g., inverted index data structure), so that it may be used with any modern search engine, e.g., Lucene, achieving real-time response without the need for ANN infrastructure. In some embodiments, SPARTA may be able to achieve less than 200 ms delay when searching from 10 million records, an 8,000× increase in speed compared to MRC models, or 200× increase in speed compared to ANN. Furthermore, SPARTA is an explainable system and may provide human-readable representation that is easy to debug. In some embodiments, SPARTA was tested on retrieval question answering tasks across 12 different domains, including SQuAD, Natural Question and others, achieving 100% to 300% performance gain compared to BM25.

According to some embodiments, there may be provided the following:

A scoring method using SPARTA that may be used to calculate matching score between queries and answer candidates. SPARTA is inverted-index compatible, fast, and explainable.

Experimental results comparing SPARTA with two-tower models and BM25 across 12 different domains. SPARTA may perform superior to both baselines in all settings.

Detailed model analysis that reveals interesting insights to further understanding of SPARTA.

As used herein, unless specifically stated otherwise, the term "or" encompasses all possible combinations of elements, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C. Furthermore, the phrase "one of A and B" shall be interpreted in the broadest sense to include one of A, or one of B.

Problem Formulation

A first step to building a model may be to formulate a problem. First, the problem may be identified as answer ranking for question answering. Let q be the input question and A={(a, c)} be a set of candidate answers. Each candidate answer may be a tuple (a, c) where a is the answer text and c is any context information about the answer a. The objective is to find a model parameter θ that ranks the correct answer as high as possible, for example:

$$\theta = \underset{\theta \in \Theta}{\text{argmax}} \mathbb{E}[p_\theta((a^*, c^*) | q)] \quad (1)$$

In some embodiments, the above formulation may be considered to be general and cover the problem formulation in previous related work. For example, a typical passage retrieval system used in a pipeline open QA system may set a to be the passage and leave c empty. For the sentence-level retrieval tasks, a system may set a to be each sentence in a text knowledge base and c to be the surrounding text. Further, phrase-level QA systems may essentially set a to be all valid phrases from a corpus and c to be the surrounding text around the phrase. In some embodiments discussed herein, settings may be used in which a is a sentence from the corpus and c is the surrounding context. See, e.g., Amin Ahmad, Noah Constant, Yinfei Yang, & Daniel Cer, *Rega: An evaluation for end-to-end answer retrieval models*. It will be understood that systems and methods of exemplary embodiments discussed herein may be extended to other settings, such as those noted above. See, e.g., Danqi Chen, Adam Fisch, Jason Weston, & Antoine Bordes, *Reading Wikipedia to answer open-domain questions*; Minjoon Seo, Aniruddha Kembhavi, Ali Farhadi, & Hannaneh Hajishirzi, *Bidirectional attention flow for machine comprehension.*

SPARTA Neural Ranker

In some embodiments, to achieve both high accuracy and efficiency (e.g., ability to scale to millions of candidate answers with real-time response), the SPARTA index may be built on top of two high-level intuitions:

Accuracy: retrieve answer at query stage with rich embedding interaction between the query and answer while maintaining low computational cost.

Efficiency: create query agnostic answer representation so that answers can be pre-computed at indexing time. Since it is an offline operation, the most expressive language representation model may be deployed.

FIG. 1(*a*) shows that a SPARTA Neural Ranker may compute token-level matching score via dot product. Each query terms' contribution is first obtained via max-pooling, and then the overall query to answer score may be obtained by a summation of log ReLUs.

As shown in FIG. 1(*a*), a query may be represented as a sequence of tokens q=[$t_1$, . . . $t_{|q|}$] and each answer may also be a sequence of tokens (a, c)=[$c_1$, . . . $a_1$, . . . $a_{|a|}$, $c_{a+1}$, . . . $c_{|c|}$]. A non-contextualized embedding may be used to encode the query tokens to $e_i$, and a contextualized transformer model may be used to encode the answer and obtain contextualized token-level embedding $s_j$:

$$\varepsilon(q)=[e_1, \ldots e_{|q|}] \text{ Query Embedding} \quad (2)$$

$$\mathcal{H}(a,c)=[s_1, \ldots s_{|c|}] \text{ Answer Embedding} \quad (3)$$

Then the rank score f between a query and an answer is computed by:

$$y_i = \max_{j \in [1,|c|]} (e_i^T s_j) \text{ Term Matching} \quad (4)$$

$$\phi(y_i) = ReLU(y_i + b) \text{ Sparse Feature} \quad (5)$$

$$f(q, (a, c)) = \sum_{i=0}^{|q|} \log(\phi(y_i) + 1) \text{ Final Score} \quad (6)$$

The final score between the query and answer may be the summation of all individual scores between each query token and the answer. The logarithm operations may normalize each individual score and weaken overwhelmingly large term scores. Additionally, some embodiments of the disclosure may utilize token-level interaction and sparsity control, as further discussed below.

Token-Level Interaction

SPARTA scoring may deploy token-level interaction between the query and the answer. Motivated by bidirectional-attention flow, relevance between every query and answer token pair may be computed via dot product and max pooling, as in equation (4). Whereas in typical dual-encoder approaches, only the sequence-level interaction may be computed via dot product. Experimental results may show that fine-grained interaction leads to significant accuracy improvement. Additionally, since the answer representation only needs to be computed at the index time, s; may be obtained from powerful bidirectional transformer encoders, e.g. BERT. On the other hand, the query embedding is non-contextual, and a trade-off may be needed to facilitate real-time inference, which is explained in further detail under subheading "Indexing and Inference" below.

Sparsity Control

Sparsity may be used to facilitate efficient inference and memory foot print. This may be achieved via the combination of, for example, log ReLU and b as in equation (5). The term b may be a bias term that is used as a threshold for $y_i$ such that only query terms with $y_i > 0$ have an impact on the final score, achieving sparse activation. The log operation may be useful for regularizing individual term score and may lead to better performance and more generalized representation.

A size of a sparse vector representation may be limited to a predetermined size. Sparsity may be used to provide interpretability, and may offer flexibility to balance a trade-off relationship between memory footprint and performance. When there are memory constraints on vector size, a SPARTA vector (e.g., a sparse vector representation) may have its size reduced by keeping only the top-K important terms.

Implementation

A pretrained 12-layer 768 hidden size BERT-base-uncased may be used as the answer encoder to encode the entire context. To encode the difference between the answer sequence and its surrounding context, segment embedding such as that utilized in BERT may be used, e.g., answer tokens may have segment_id=1 whereas the context tokens have segment 0. Moreover, the query tokens may be embedded via word embedding, such as that utilized in BERT-base-uncased with dimension 768.

Learning to Rank

The training of SPARTA may use cross entropy learning to rank loss and maximize the following. The objective may be to distinguish between the true relevant answer and irrelevant or random answers for each training query:

$$J = f(q(a^+, c^+)) - \log \sum_{k \in K^-} e^{f(q,(a_k, c_k))} \quad (7)$$

The choice of negative samples K may be useful for effective learning. For example, in some embodiments, two types of negative samples may be used: 50% of the negative samples are randomly chosen from the whole answer candidate set, whereas the remaining 50% are sentences that are nearby the ground truth answer a, which may require the model to learn fine-grained differences between each sentence candidate instead of only relying on the context information. The parameters to learn include the both the query encoder E (see equation (2)) and the answer encoder H (see equation (3)). Parameters are optimized using back propagation (BP) through the neural network.

Indexing and Inference

In some embodiments, SPARTA may be used for real-time inference. For example, for a testing query $q = [t_0, \ldots t_{|q|}]$, the ranking score between q and an answer may be:

$$\text{LOOKUP}(t, (a, c)) = \log(\text{Eq. } 5) \; t \in V \quad (8)$$

$$f(q, (a, c)) = \sum_{i=0}^{|q|} \text{LOOKUP}(t_i, (a, c)) \quad (9)$$

Since the query term embedding is non-contextual, the rank feature $\Phi(t, (a, c))$ may be computed for every possible term t in the vocabulary V with every answer candidate. The result score may be cached in the indexing time as shown in equation (8). At inference time, the final ranking score may be computed via O(1) look up plus a simple summation as shown in equation (9).

Figure 1B:
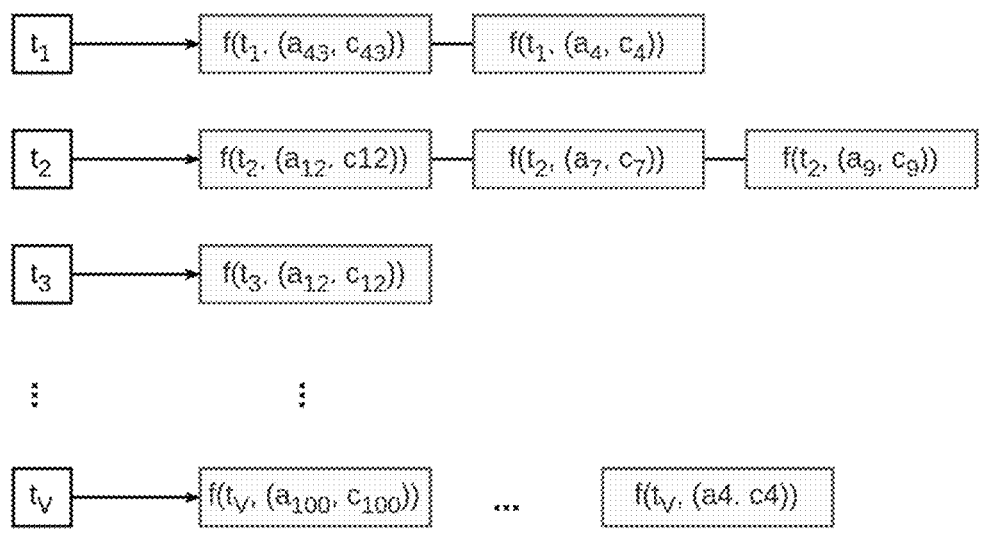
FIG. 1(b) is a diagrammatic representation of a SPARTA index that may be an Inverted Index, consistent with embodiments of the disclosure.

The above computation may be efficiently implemented via an Inverted Index (e.g., using a database with inverted index data structure), which may be the underlying data structure for modern search engines, e.g. Lucene as shown in FIG. 1(b). This property may improve the ability to apply SPARTA to real-world applications.

Relation to Classic IR

SPARTA may relate to classic TF-IDF or BM25-based methods. In the classic IR method, only the tokens appearing in the answer are saved to the Inverted Index. The final score is a combination of Term Frequency and Inverted Document Frequency via heuristics. On the other hand, given a candidate answer, SPARTA may learn which term in the vocabulary should be inserted into the index, and predict the ranking score directly rather than using a fixed TF-IDF calculation. This facilitates the system to find relevant answers even if none of the query words appear in the answer text. For example, if the answer sentence is "Bill Gates founded Microsoft," a SPARTA index may contain not only the tokens in the answer, but also include relevant terms, e.g., who, founder, entrepreneur, etc.

In some embodiments, SPARTA may also be understood as a form of generative QA without term independence assumptions. As an illustration, past work may train a question generator to score the answer via likelihood. Some works may, for example, attempt to fine-tune Google T5 to augment documents with potential questions. However, both such approaches focus on auto-regressive models and the quality of questions, and the approaches do not provide an end-to-end solution that facilitates stand-alone and real-time answer retrieval.

EXAMPLES

A better understanding of the present disclosure may be obtained through the following examples, which are set forth to illustrate, but not to be construed as limiting, the present disclosure.

Experimental results will be discussed in both a modified cross-domain ReQA task that spans over 12 different domains and open-domain question answering based on Wikipedia.

Multi-Domain Retrieval Question Answering (MultiReQA)

Retrieval Question Answering (ReQA) is a sentence-level answer extractive question answer task. A candidate answer set may contain every possible sentence from a text corpus and a system may be expected to return the top-K matched sentences given a question. In a comparative example, original ReQA may use only two domains: SQuAD and Natural Question.

In some embodiments, ReQA may be extended to 12 different domains to extensively evaluate different approaches for both in-domain scenarios and out-of-domain scenarios.

For in-domain scenario experiments, domains may be chosen that contain training data (see Table 1) and performance may be evaluated on their dev/test set. On the other hand, system performance may be evaluated on out-of-domain scenarios in domains that are different from the training data. Training data may be limited only to be SQuAD 1.1 and to test on the rest of the 11 domains, treating them as "out-of-domain," a zero-shot learning problem. The details of these 12 domains are summarized in Table 1.

TABLE 1

| Has Training Data | Data Source |
|---|---|
| SQuAD (Rajpurkar et al., 2016) | Wikipedia |
| News (Trischler et al., 2016) | News |
| Trivia (Joshi et al., 2017) | Web |
| NQ (Kwiatkowski et al., 2019) | Google Search |
| MARCO (Nguyen et al., 2016) | Bing Search |
| Hotpot (Yang et al., 2018) | Wikipedia |
| Has no Training Data | |
| BioASQ (Tsatsaronis et al., 2015) | PubMed Docs |
| DROP (Dua et al., 2019) | Wikipedia |
| DuoRC (Saha et al., 2018) | Wikipedia + IMDB |
| RACE (Lai et al., 2017) | English Exam |
| RE (Levy et al., 2017) | Wikipedia |
| Textbook (Kembhavi et al., 2017) | K12 Textbook |

As shown in Table 1, 12 corpora may be included in MultiReQA evaluation. The top 6 domains are used for in-domain evaluation and the bottom 6 domains are used for out-of-domain evaluation.

For evaluation metrics, Mean Reciprocal Rank (MRR) may be used as the major criteria. Also, Recall at N (N=1, 5, 10) may be reported as an auxiliary metric. The competing baselines include:

BM25: a proven strong baseline that is difficult to beat.
BOW Embedding: using Glove word embedding to obtain query and answer representation via average pooling. The ranking score is the cosine similarity between the two vectors.
USE-QA: universal sentence encoder trained for QA task by Google.
BERT Dual Encoder: a standard dual encoder may be trained with two BERT models using cross-entropy loss. The [CLS] token output is used as the sequence representation.

Open-Domain Question Answering

Some embodiments may consider open-domain QA with SQuAD 1.1. Wikipedia 201× dump may be used as the text knowledge base and indexing may be done on every sentence in the data as candidate answers. In total, there are X million candidate sentences for retrieval. In order to extract phrase-level span as required by SQuAD, a pretrained MRC reader based on SpanBERT may be used to extract answer phrases from the top-K returned sentences. Evaluation metrics may include the two standard metrics (EM & F1) from SQuAD and a new S-Recall score:

Exact Match (EM): if the top-1 answer span matches with the ground truth exactly.
F1: compute word overlapping between the returned span and the ground truth answer.
Sentence-level Recall (S-Recall): Since SPARTA returns sentence-level answers, this metric may be a successful prediction if the ground truth answer can be found in the sentence.

MultiReQA Results

In some embodiments, a model using SPARTA may consistently outperform all the baseline models by a large margin.

Token-level interaction mechanisms may be significant for achieving effective answer retrieval. Although Dual-BERT models of comparative methods may order information in the query, performance may be limited by the simple sequence-level dot product interaction between the query and the answer. On the other hand, in some embodiments, SPARTA does not model word orders in the query, yet it may achieve significantly better performance then both dual encoder models.

TABLE 2

| Data | BM25 | USE-QA | Poly BERT | SPARTA (ours) |
|---|---|---|---|---|
| SQuAD | 58.0 | 62.5 | 64.6 | 78.5 |
| News | 19.4 | 26.2 | 28.3 | 46.6 |
| Trivia | 29.0 | 41.2 | 39.5 | 55.5 |
| NQ | 19.7 | 58.2 | 69.9 | 77.1 |
| HotPot | 23.9 | 25.5 | 51.8 | 63.8 |

As shown in Table 2, an MRR comparison for in-domain settings may show that SPARTA may outperform baseline models, such as BM25 and USE-QA that are unsupervised and pre-trained respectively.

TABLE 3

| Model | SQuAD | News | Trivia | NQ | HotPot | Bio | DROP | DuoRC | RACE | RE | Text | Avg |
|---|---|---|---|---|---|---|---|---|---|---|---|---|
| Unsupervised or pretrained | | | | | | | | | | | | |
| BM25 | 58.0 | 19.4 | 29.0 | 19.7 | 23.9 | 8.9 | 32.6 | 20.1 | 14.8 | 87.4 | 21.6 | 30.5 |
| USE-QA | 62.5 | 26.2 | 41.2 | 58.2 | 25.5 | 7.7 | 31.9 | 20.8 | 25.6 | 84.8 | 26.4 | 37.4 |
| Trained on SQuAD | | | | | | | | | | | | |
| PolyBERT | 64.6* | 22.2 | 35.9 | 57.6 | 26.5 | 9.1 | 32.6 | 25.4 | 24.7 | 88.3 | 26.0 | 37.5 |
| SPARTA | 78.5* | 41.2 | 45.8 | 62.0 | 47.7 | 14.5 | 37.2 | 35.9 | 29.7 | 96.0 | 28.7 | 47.0 |

TABLE 3-continued

| Model | SQuAD | News | Trivia | NQ | HotPot | Bio | DROP | DuoRC | RACE | RE | Text | Avg |
|---|---|---|---|---|---|---|---|---|---|---|---|---|
| | | | | Trained on SQuAD + NQ | | | | | | | |
| PolyBERT | 63.9* | 19.8 | 36.9 | 69.7* | 29.6 | 8.8 | 30.7 | 19.6 | 25.2 | 72.8 | 24.6 | 36.5 |
| SPARTA | 79.0* | 40.3 | 47.6 | 75.8* | 47.5 | 15.0 | 37.9 | 36.3 | 30.0 | 97.0 | 29.3 | 48.7 |

As shown in Table 3, an MRR comparison for out-of-domain settings may show that SPARTA may achieve the best performance across all tasks, and may be the only learning-based method that is able to consistently outperform BM25 with larger margin in new domains.

TABLE 4

| Answer | William Henry Gates III is an American business magnate, software developer, investor, and philanthropist. |
|---|---|
| Top Terms | who, gates, investors, magnate, developer, microsoft, philanthropist, benefactor investors . . . (about 1600 nonzero terms) |

To further understand SPARTA's behavior, Table 4 shows its typical output given an example sentence.

Several observations may be drawn about what is learned:

Conversational search understanding: "who" appears in the top-1 term in the sparse representation, showing it learns Bill Gates is a person so that it is likely to match with Who questions.

Key term identification: terms such as "gates, investors, magnate, developer" have high scores in the sparse vector, showing that SPARTA learns which words are important.

Common sense knowledge: although Microsoft does not appear at all in the original sentence, it is predicated as an important term for this answer, showing that SPARTA leverages the world-knowledge encoded in training data.

Natural language variations: "benefactor, investors" are examples where SPARTA predicts similar words that appear in the sentence, making it robust against different lexical variations. In some embodiments, a 14-word sentence is augmented into over 1500 terms.

Methods and Systems

Figure 2:
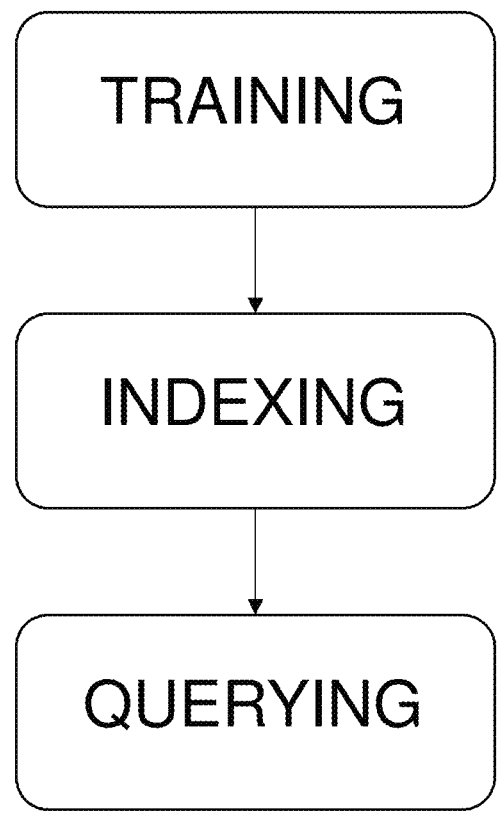
FIG. 2 is a flow chart of a question answering method, consistent with embodiments of the disclosure.

In some embodiments, a method of question answering may include steps of training (S101), indexing (S102), and querying (S103), for example as shown in FIG. 2. Training may include a step of building an encoder (e.g., a machine learning model) using question answering datasets. The datasets may be provided in a database. The datasets may include documents of unstructured text.

Indexing may include a step of converting data in the datasets. Indexing may use the encoder trained on the question answering datasets. Data in the datasets may include text. Every sentence of text may be converted to a sparse vector representation and stored in the database with an inverted index data structure. The sparse vector representation may include a vector with vector components (e.g., terms and weights) that are determined by an activation function and a bias term. Sparsity of the vector components may be controlled by parameters of the activation function and bias term.

Indexing may use an inverted index. The inverted index may include an index database structure storing a mapping from terms to documents (e.g., document ID).

The encoder may be configured to receive input of data from datasets (e.g., a document) and to output terms with weights. The encoder may be configured to output terms including additional terms that are based on context (and that may not be included in the input). The database may be provided with inverted index data structure that may be formed using the encoder.

Querying may include a step of processing a query. The query may be input by a user. Querying may be done in real-time. Querying may involve converting the query to tokens (e.g., tokenizing). Querying may involve scoring. For example, a score may be determined between query tokens and answer candidates. Among many individual terms and associated weights in the index of answer candidates, query terms may be looked up in the index of answer candidates. A sum may be determined based on the terms and their weights.

In a comparative example, an encoder may be configured to output a fixed size vector. Such an encoder may not be able to map each term and weight. Furthermore, the output of such an encoder may contain the whole vocabulary of an input document but with different weights, so it may not be meaningful to build an inverted index therefrom. For example, each term may always map to all documents. Processing information using a comparative method may involve heavy calculations.

A method using sparse representation may flexibly configure vector size. For example, an activation function and bias term may be used to filter certain terms that are below a threshold level of relevance. Sparsity may relate to the degree of filtering of terms. A sparse vector representation may be obtained that may improve performance and facilitate real-time response. Furthermore, relevant data may be included that is based on context, and may add potentially relevant results. Results may be customizable (e.g., outputting n-best relevant documents).

A system using a sparse vector representation may be configured to learn sparse answer representations that model potential interactions between every query term and an answer. Learned sparse answer representations may be efficiently saved in a SPARTA index that may be an inverted index, and querying of the SPARTA index may be achieved with speed similar to a standard search engine while enjoying more reliable ranking performance without depending on GPU or ANN searches.

The block diagrams in the figures illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit or an electronic control unit. Blocks may also represent a module, a segment, or a portion of code that comprises one or more executable instructions for implementing the specified logical functions. Controllers may be programmed to execute such instructions. It should be understood that in some implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted.

It should also be understood that each block of the block diagrams, and combination of the blocks, may be implemented by special purpose hardware-based systems that perform the specified functions or acts, or by combinations of special purpose hardware and computer instructions. It will be appreciated that the embodiments of the present disclosure are not limited to the exact construction that has been described above and illustrated in the accompanying drawings, and that various modifications and changes can be made without departing from the scope thereof. For example, while examples have been discussed in the context of questioning answering, embodiments of the disclosure may be applicable to other forms of data processing.

What is claimed is:

1. A computer-implemented method for answer ranking for question answering comprising:
   determining an index using a machine learning model trained on datasets by:
      converting a text of the datasets to a sparse vector representation, wherein the text includes answer candidates;
      storing the converted text in a database associated with the index; and
      generating a structure associated with the index that represents a relationship between questions and the answer candidates;
   determining a score between the questions and the answer candidates from the index, wherein the score includes a summation; and
   providing a real-time inference by:
      receiving a question from a user;
      determining a rank feature of the sparse vector representation for the question and the answer candidates in a time associated with the index;
      storing the rank feature in the index;
      determining a final ranking score by computing a summation of a look up of the stored rank feature in the index; and
      providing a natural language output to the user that includes at least a part of the answer candidates for the question based on the final ranking score.

2. The method of claim 1, wherein the datasets further comprise pairs of data, wherein the pairs of data include questions and answers.

3. The method of claim 1, wherein first data comprises the questions and second data comprises the answer candidates, the second data further comprising a tuple including answer text and contextual information associated with the answer text.

4. The method of claim 3, wherein the score represents a relevance between the questions and the answer candidates.

5. The method of claim 3, further comprising:
   determining a final score between the questions and the answer candidates by summing individual scores between each question token and answer.

6. The method of claim 5, further comprising:
   summing a logarithm of the individual scores between each question token and answer.

7. The method of claim 1, further comprising:
   matching the answer candidates to the questions; and
   retrieving the answer candidates in response to input of the questions.

8. The method of claim 1, wherein the sparse vector representation comprises a vector including terms and weights, the terms and weights being determined by using an activation function and a bias term.

9. The method of claim 8, wherein the activation function comprises a rectified linear unit.

10. The method of claim 1, further comprising:
    using a lookup function on text and context information of the answer candidates.

11. The method of claim 1, further comprising:
    tokenizing the questions.

12. The method of claim 11, further comprising:
    encoding the tokenized questions using non-contextualized embedding.

13. The method of claim 1, further comprising:
    tokenizing the answer candidates.

14. The method of claim 13, wherein determining the rank feature comprises:
    using a lookup function on the answer candidates and terms in a vocabulary of the datasets.

15. The method of claim 1, wherein the machine learning model includes a contextualized transformer model that encodes the answer; and
    obtains a contextualized token-level embedding.

16. The method of claim 1, wherein a size of the sparse vector representation is limited to a predetermined size determined based on memory constraints.

17. The method of claim 1, further comprising:
    accessing the index;
    receiving the question from an input from the user;
    converting the question into at least one question token; and
    determining a score between the at least one question token and at least one answer candidate.

18. The method of claim 17, further comprising:
    storing in the index at least one of terms, weights, or answer candidates;
    looking up terms in the index; and
    determining a sum based on the terms and the weights.

19. A method for training a machine learning model for open domain question answering, comprising:
    building an encoder using question answering datasets, wherein the datasets include text data, and wherein the encoder receives the text data from the datasets and outputs at least one of terms, weights, or a structure that represents a relationship between questions and answer candidates, wherein the text data includes the answer candidates;
    determining a relevance between the questions and the answer candidates by:
      converting the questions and the answer candidates to question and answer token pairs, wherein each question is represented by a series of question tokens and each answer is represented by a series of answer tokens, the answer tokens comprising a text term and a context term;
      optimizing the machine learning model based on a cross entropy objective function of the question and answer candidates;
      determining a token-level matching score using dot product and max pooling;

determining a rank feature on the matching score using an activation function and a bias term, wherein the activation function comprises a rectified linear unit;
performing a lookup of the rank feature; and
determining a final ranking score between the questions and the answer candidates based on a summation of the lookup of the rank feature for each of the question and answer token pairs.

20. A controller comprising:
a processor; and
a storage communicatively coupled to the processor, wherein the processor is configured to execute programmed instructions stored in the storage to:
  determine an index using a machine learning model trained on datasets by:
    converting a text of the datasets to a sparse vector representation, wherein the text includes answer candidates;
    storing the converted text in a database associated with the index; and
    generating a structure associated with the index that represents a relationship between questions and the answer candidates;
  determine a score between the questions and the answer candidates from the index, wherein the score includes a summation; and
  provide a real-time inference by:
    receiving a question from a user;
    determining a rank feature of the sparse vector representation for the question and the answer candidates in a time associated with the index;
    storing the rank feature in the index;
    determine a final ranking score by computing a summation of a look up of the stored rank feature in the index; and
    providing a natural language output to the user that includes at least a part of the answer candidates for the question based on the final ranking score.

* * * * *